United States Patent [19]

Ruzicka

[11] Patent Number: 4,550,499
[45] Date of Patent: Nov. 5, 1985

[54] STRING TRIMMER WITH CUT LINE RETENTION POCKET

[75] Inventor: Alan V. Ruzicka, Santa Monica, Calif.

[73] Assignee: McCulloch Corporation, Los Angeles, Calif.

[21] Appl. No.: 515,015

[22] Filed: Jul. 18, 1983

[51] Int. Cl.$^4$ ............................................ A01D 50/00
[52] U.S. Cl. ........................................ 30/276; 56/12.7
[58] Field of Search ..................... 30/276, 347; 56/12.7

[56] References Cited

U.S. PATENT DOCUMENTS

| 4,052,789 | 10/1977 | Ballas ................................... 30/276 |
| 4,161,820 | 7/1979 | Moore .................................. 30/276 |
| 4,209,902 | 7/1980 | Moore et al. ......................... 30/276 |
| 4,282,653 | 8/1981 | Comer et al. ......................... 30/276 |
| 4,316,325 | 2/1982 | Brucker ................................ 30/276 |

FOREIGN PATENT DOCUMENTS 2115665  9/1983  United Kingdom .

Primary Examiner—Jimmy C. Peters
Attorney, Agent, or Firm—Murray, Whisenhunt and Ferguson

[57] ABSTRACT

A flexible line vegetation trimmer is disclosed, wherein the trimmer includes a conventional line cutting element mounted for rotation about an axis to define a cutting path, a debris shield mounted above at least an arc of the cutting path, and a cutting blade on the debris shield for cutting segments from the line to reduce the line length to a predetermined distance. In this generally conventional line trimmer the present invention provides a cut line pocket mounted below the debris shield, and having the cutting blade mounted at the mouth thereof, with the cut line pocket catching the segments of line cut from the line by the cutting blade. The cut segments are trapped in the cut line pocket, thereby reducing if not eliminating the danger of the cut segments striking a person or animal in the vicinity of the operating line trimmer.

12 Claims, 13 Drawing Figures

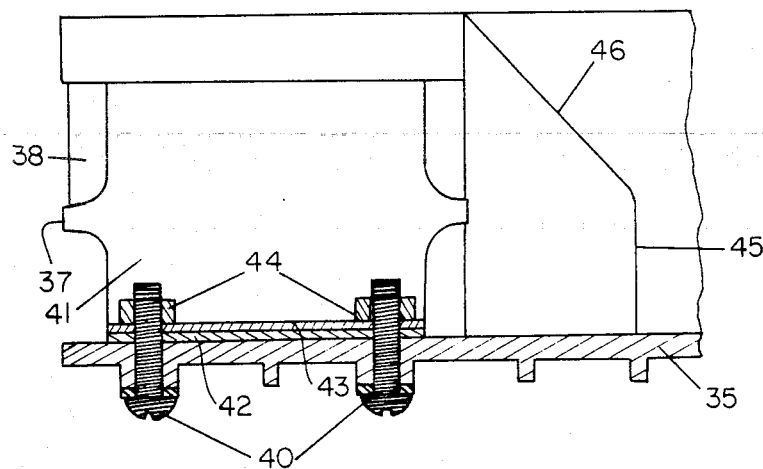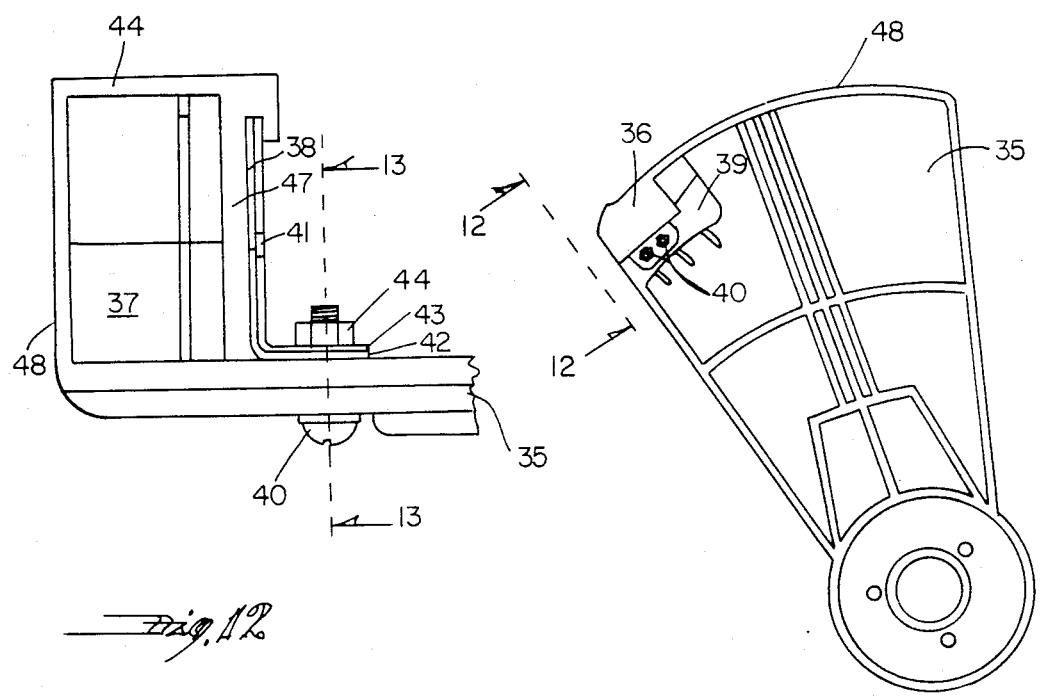

STRING TRIMMER WITH CUT LINE RETENTION POCKET

BACKGROUND OF THE INVENTION

Conventional flexible line vegetation trimmers, often called string trimmers, are well known to those in the art. See, for instance, U.S. Pat. Nos. 4,052,789, 4,054,992, 4,161,280, 4,209,902, 4,282,653 and 4,316,325. Each of these line trimmers discloses a rotating head from which protrudes at least one flexible cutting line. Most of the above-mentioned patents include a debris shield mounted over the cutting path of the flexible line to help protect the string trimmer operator from flying debris. Each of the aforesaid patents includes a knife blade depending from the debris shield or other structural member to cut the rotating flexible line or string to a predetermined length.

The problem arises with respect to the cut segments of flexible line or string. These segments are traveling at a relatively high speed, and a danger exists that the cut line segments may strike a human or animal in the vicinity of the operating string trimmer. If the human or animal is struck, serious damage could result.

U.S. Pat. No. 4,054,992 suggests, at column 6, lines 50-55 that the cutting lines should preferably be as light weight as possible so that when the line shears or breaks during use and pieces are thrown from the cutter head, such pieces will travel only a limited distance and will strike persons or other objects in the immediate vicinity with harmless impact if any. If the cutting line is of sufficient light weight so as to reduce the danger to persons or animals in the immediate vicinity, then the cutting line will have such reduced resistance to abrasion and the like upon operation as to be highly undesirable. Furthermore, smaller diameter lines have a higher probability of piercing skin upon impact, and for that reaon may be quite dangerous to those in close proximity to an operating string trimmer. In fact, a number of string trimmers are currently being offered on the commerical market in the United States with relatively heavy cutting lines, capable of relatively extended use before breaking due to abrasion or the like. It will be readily appreciated that these relatively heavy cutting lines, which are especially found in the heavy duty string trimmers, such as gasoline engine powered string trimmers, subject persons or animals in the immediate vicinity of the string trimmer to greater danger from being struck with cut line segments.

FIELD OF THE INVENTION

The present invention is directed to flexible line vegetation trimmers or string trimmers wherein the danger to a person in the immediate vicinity of the operating string trimmer of being hit by a cut line segment is at least reduced if not eliminated.

SUMMARY OF THE INVENTION

The present invention is directed to a vegetation string trimmer which includes a length of flexible line, preferably of non-metallic material, and a rotatable support head for revolving the line about an axis and in a cutting plane. A shield extends over at least an arc of the cutting plane circle in which the line revolves, and a cutting blade is associated with the shield and spaced a predetermined distance from the axis in the cutting plane for trimming the line to a predetermined length upon line rotation. A cut line pocket is attached to the lower part of the shield and has the cutting blade located at the inner side of the cut line pocket mouth. When the cutting blade cuts off segments of line the cut segments immediately pass into the cut line pocket, which preferably retains the cut segments to eliminate the danger of personal injury to persons in the vicinity of the operating trimmer. Preferably the cut line pocket deflects the cut line segments on at least one inclined or radiused surface or wall so as to reduce the velocity and change the direction of travel of the cut line segments, so as to retain the cut line segments within the cut line pocket.

GENERAL DESCRIPTION OF THE DRAWINGS

The present invention will be understood more readily with reference to the accompanying drawings, wherein:

FIG. 11 is a bottom view of a different string trimmer debris shield having a different embodiment of the cut line pocket utilized therewith;

FIG. 12 is a front view of the debris shield and cut line pocket of FIG. 11, taken along line 12—12; and FIG. 13 is a partial cross-sectional view of the debris shield and cut line pocket of FIG. 12, taken along line 13—13.

Figure 1:
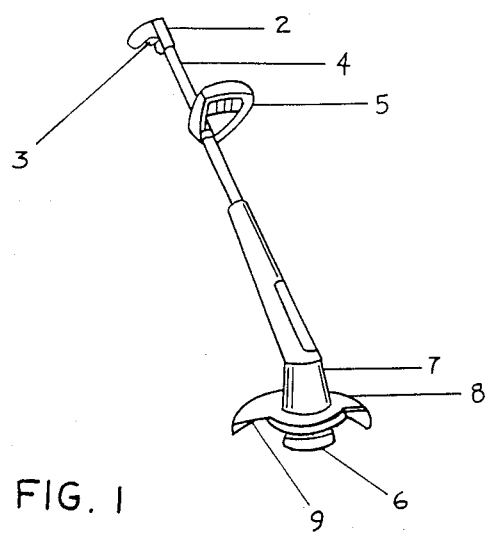
FIG. 1 is a view of the string trimmer of the present invention.

The string trimmer 1 of FIG. 1 includes a handle 2 with associated trigger 3 for controlling the electric motor (not shown) which is the source of power for the string trimmer. The electric motor is in electrical connection by a cord (not shown) to a source of suitable electric power. Handle 2 is mounted upon shaft 4, which also carries a grip 5 in the middle portion thereof, and a rotatable trimmer head 6 and associated housing 7 at the end of the shaft opposite handle 2. Shield 8 overlies an arc of the cutting path of the rotating string, and cut line pocket 9 is mounted upon shield 8. Cut line pocket 9 includes an open end 10 which has line cutter 11 mounted along the interior side thereof. Holes 12 in shield 8 are located in recesses 13 and permit the attachment of the cut line pocket 12 to debris shield 8 by means of bolts 14 and nuts 15. The cut line pocket includes a sidewall 16, a rear wall 17, a bottom 18, and an angled wall 19 extending between bottom 18 and rear wall 17. Flange or lip 20 provides a convenient means for mounting cut line pocket 9.

Figure 4:
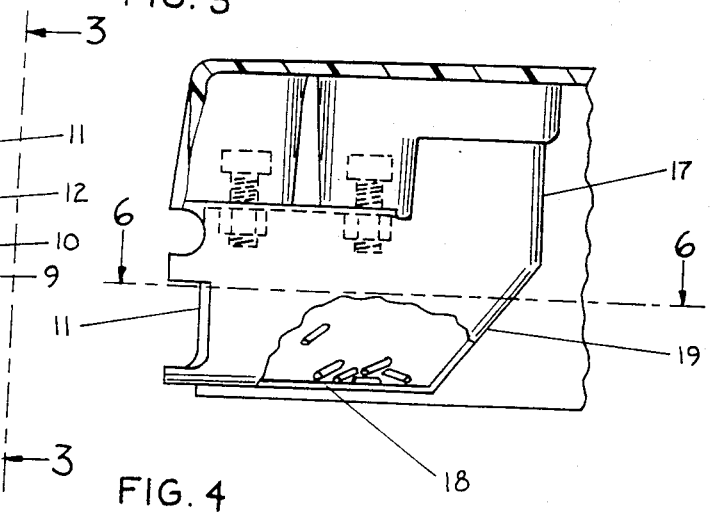
FIG. 4 is a cross-sectional view of the cut line pocket and debris shield of FIG. 3, taken along line 4—4.
Figure 5:
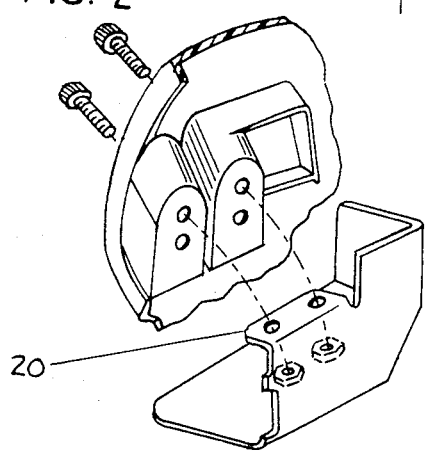
FIG. 5 is a an exploded view of the debris shield and cut line pocket of FIG. 2.
Figure 6:
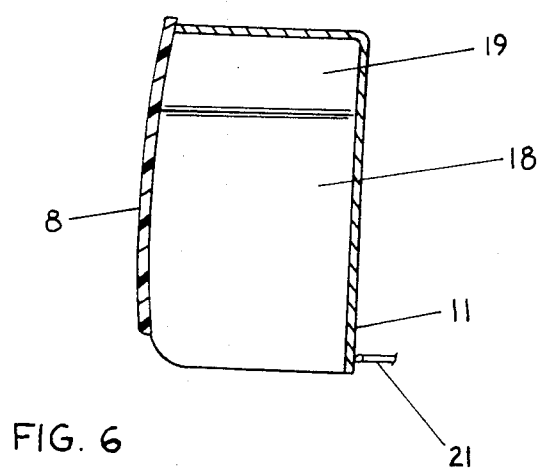
FIG. 6 is a cross-sectional view of the debris shield and cut line pocket of FIG. 4, taken along line 6—6.
Figure 7:
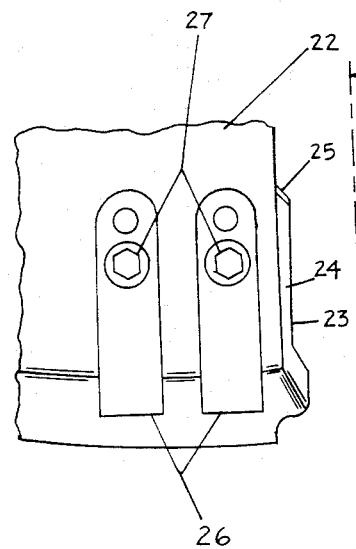
FIG. 7 is an overhead partial view of the string trimmer debris shield of FIG. 1 with a different embodiment of the cut line pocket utilized therewith.

Line 21, which is preferably non-metallic, generally of a plastic material such as nylon or the like, is cut to a predetermined length upon rotation of head 6 by line cutter 11, and the cut segments of line 21 are flung into cut line pocket 9, wherein they impinge upon angled wall 19 and are deflected against a portion of debris shield 8. Because of such impingements the cut line segments rapidly lose their velocity and fall upon the bottom 18 of cut line pocket 9, as illustrated most clearly in FIG. 4.

The embodiment of the present invention illustrated in FIGS. 7-10 includes a debris shield 22 which may be identical to shield 8 of FIGS. 1-6. Small cut line pocket 23 is attached to debris shield 22 and includes an open end 24 and a cutter blade 25 mounted on the interior side of open end 24. Recesses 26 in the upper surface of debris shield 22 provide a convenient location for holes 32, which receive bolts 27. Lip 33 is mounted upon debris shield 22 by bolts 27 and nuts 28. The cut line pocket 23 includes a bottom 29, a back 30, an angled wall 31 and a sidewall 34.

Figure 3:
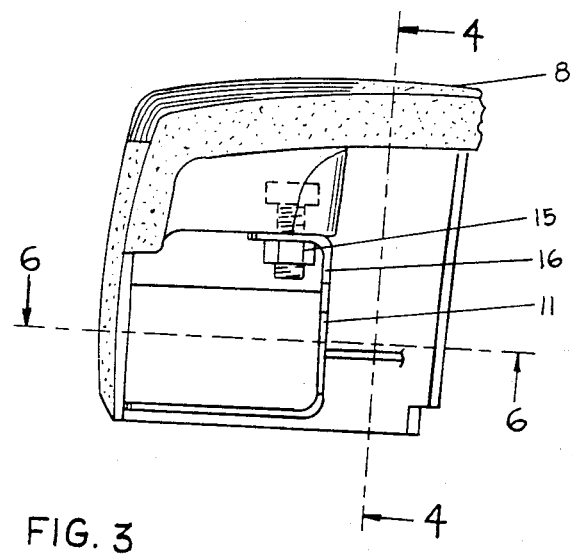
FIG. 3 is a front view of the debris shield and attached cut line pocket of FIG. 2, taken along line 3—3.
Figure 2:
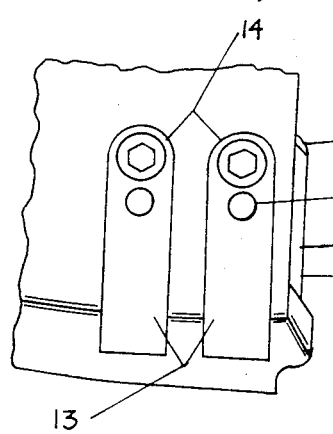
FIG. 2 is a partial overhead view of the debris shield of the string trimmer of FIG. 1.
Figure 8:
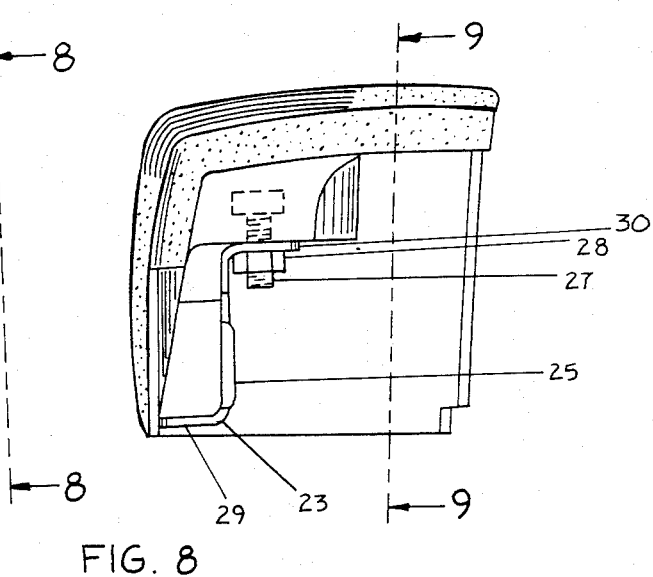
FIG. 8 is a front view of the debris shield and cut line pocket of FIG. 7, taken along line 8—8.
Figure 9:
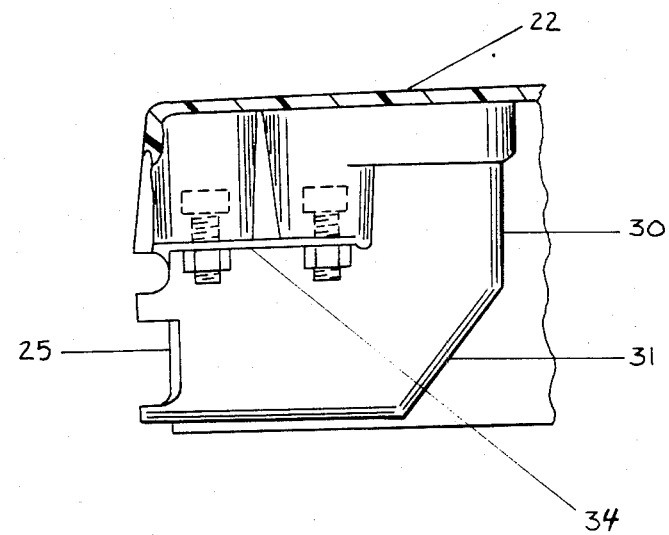
FIG. 9 is a cross-sectional view of the debris shield and cut line pocket of FIG. 8, taken along line 9—9.
Figure 10:
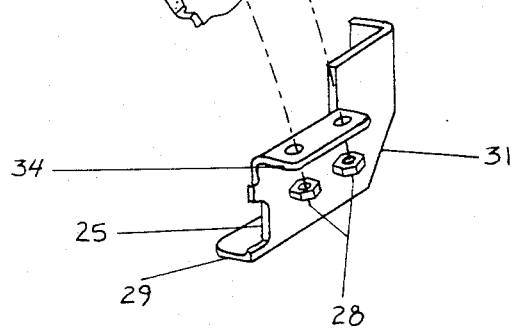
FIG. 10 is an exploded view of the debris shield of FIGS. 7, 8 and 9.

As will be readily appreciated from comparing FIGS. 3 and 8, the size of the cut line pocket of the present invention can be readily varied, even using the same mounting holes in the string trimmer debris shield.

The embodiment of the present invention illustrated in FIGS. 11-13, designed to fit a different model of string trimmer, includes a debris shield 35 having a cut line pocket 36 attached thereto. Cut line pocket 36 includes an open end 37 and a cutter blade 38 mounted on the interior side of open end 37. Recess 39 in the upper surface of debris shield 35 provides a convenient location for holes (not shown) through which pass bolts 40. Cutter 38 and reinforcing plate 41 have lips 42 and 43, respectively, which are mounted upon debris shield 35 by bolts 40 and nuts 44. The cut line pocket 36 includes a bottom 44, a back 45, an angled wall 46 and a sidewall 47. Debris shield 35 has an outer lower flange 48 which forms one wall of pocket 36.

The embodiment of FIGS. 11-13 is designed for use with a twin monofilament string trimmer, having monofilament line or string of a heavy duty, larger diameter.

While the safety pocket has been illustrated in the accompanying drawings as including an angled or inclined wall, it is clear that the wall could be formed by gradually curving the bottom wall into the back wall, thereby producing a radiused or curved surface against which the cut line segments impinge.

While the string trimmer of the present invention has been illustrated with reference to an electric powered string trimmer, it will be readily appreciated that other power sources, and especially internal combustion engines fueled by gasoline, can be readily used.

The cut line pocket of the present invention could extend around substantially the entire circumference of debris shield 8 of FIG. 1 if desired, in order to provide a greater volume for receiving cut string segments and other debris. With such an extended cut line pocket it may be unnecessary to utilize an inclined wall against which the cut segments would impinge, as the cut line segments traveling in such an extended cut line pocket could impinge against the substantially horizontal walls of debris shield 8. However, the provision of such larger cut line pockets would increase the weight of the resulting string trimmer, so that the embodiment illustrated in e.g. FIG. 4, utilizing an inclined wall to prevent the cut line segments from bouncing out of the cut line pocket, is preferred.

The present invention is particularly directed to string trimmers having a debris shield which extends over no more than half of the cutting path. Preferably the debris shield covers no more than a 90° arc of the string cutting path, and more preferably the arc is about 45°.

It is claimed:

1. An apparatus for cutting vegetation and the like comprising head means rotatable about an axis in a cutting plane, flexible line member having at least one portion coiled within said head means and having at least one uncoiled portion extending outwardly of the periphery of said head means and rotating in said cutting plane, a housing means generally overlying at least an arc of the portion of said cutting plane in which said uncoiled portion rotates, and cutting means associated with said housing means and spaced from said axis in said cutting plane for trimming said line member to a predetermined length upon rotation of said head means, the improvement comprising catching means located on said housing for catching and retaining segments of said line member cut by said cutting means so that the danger of personal injury to persons in the vicinity of said apparatus when said head means is rotating and said line member is cut is reduced.

2. Apparatus of claim 1 wherein said catching means is a pocket with an open end and a closed end, and said segments enter said pocket through said open end.

3. Apparatus of claim 2, wherein said closed end has a surface means extending at an angle of from 30° to 60° to said cutting plane for said segments to impinge against.

4. Apparatus of claim 3, wherein said surface means extends at an angle of about 45° to said cutting plane.

5. A vegetation trimmer comprising at least one length of flexible line, rotatable support means for revolving said line about an axis in a circular cutting plane, shield means extending over at least an arc of the circular cutting plane, cutting means associated with said shield means and spaced from said axis in said cutting plane for trimming said line to a predetermined length upon line rotation, and cut line means associated with said shield means and generally located adjacent said cutting blade means for at least reducing the velocity of segments of said line cut by said cutting blade means to the point that the danger of personal injury to persons in the vicinity of the operating trimmer is reduced by impinging the cut line segments against a plurality of surfaces of the trimmer wherein said cut line means is a pocket in said shield means for catching and retaining said segments.

6. Trimmer of claim 5, wherein the pocket is open-ended with the segments entering the pocket at the open end, and the end of the pocket opposite the open end has a surface means extending at an angle of about 30° to 60° from the cutting plane for providing a surface against which the cut segments impinge and change direction of travel.

7. Trimmer of claim 6, wherein said angle is about 45°.

8. Trimmer of claim 7, wherein the pocket includes an inner wall extending generally perpendicularly to said cutting plane and closest to said axis, said open end being adjacent to the inner wall and being ahead of the inclined surface with respect to the direction of rotation of said line, said cutting blade means being associated with said inner wall at the open end of said pocket.

9. Trimmer of claim 5, wherein the surfaces extend at an angle to each other.

10. In a vegetation line trimmer of the type in which at least one line cutting element is mounted for rotation about an axis to define a cutting path, a debris shield is mounted above at least an arc of said cutting path to protect the trimmer operator from debris, and cutting means for cutting segments from said line to reduce the line length from said axis to the free end of the line to a predetermined distance are associated with the shield, the improvement comprising cut line means associated with said shield for at least reducing the velocity of cut line segments to the point such as to at least reduce the risk of personal injury to persons in the vicinity of the operating trimmer by catching the cut line segments, wherein said cut line means is a pocket having an open end and a closed end, said closed end including a rear wall, inclined to said cutting path at an angle of about 30° to 60°, against which the cut line segments impinge.

11. Trimmer of claim 10, wherein said angle is about 45°.

12. Trimmer of claim 10, wherein the debris shield is mounted above a cutting path arc of no greater than 90°.

* * * * *